United States Patent
Kuenzi et al.

(10) Patent No.: US 10,062,226 B2
(45) Date of Patent: Aug. 28, 2018

(54) ACCESS CONTROL SYSTEM WITH AUTOMATIC MOBILE CREDENTIALING SERVICE HAND-OFF

(71) Applicant: Carrier Corporation, Jupiter, FL (US)

(72) Inventors: Adam Kuenzi, Silverton, OR (US); Jonah J. Harkema, Newberg, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 15/528,829

(22) PCT Filed: Dec. 1, 2015

(86) PCT No.: PCT/US2015/063148
§ 371 (c)(1),
(2) Date: May 23, 2017

(87) PCT Pub. No.: WO2016/089841
PCT Pub. Date: Jun. 9, 2016

(65) Prior Publication Data
US 2017/0345236 A1    Nov. 30, 2017

Related U.S. Application Data

(60) Provisional application No. 62/086,262, filed on Dec. 2, 2014.

(51) Int. Cl.
*H04L 9/30* (2006.01)
*G07C 9/00* (2006.01)
(Continued)

(52) U.S. Cl.
CPC ............ *G07C 9/00103* (2013.01); *H04L 9/30* (2013.01); *H04L 63/0853* (2013.01);
(Continued)

(58) Field of Classification Search
None
See application file for complete search history.

(56) References Cited

U.S. PATENT DOCUMENTS 7,315,823 B2 * 1/2008 Brondrup ............... G06Q 10/02
 705/5
9,312,926 B2 * 4/2016 Neafsey ............... H04B 5/0056
(Continued)

FOREIGN PATENT DOCUMENTS

EP       2 620 919 A1    7/2013
WO    2013/074301 A1    5/2013

OTHER PUBLICATIONS

International search report for Application No. PCT/US2015/063148 dated Feb. 25, 2016.

*Primary Examiner* — K. Wong
(74) *Attorney, Agent, or Firm* — Bachman & LaPointe, P.C.

(57) ABSTRACT

A method of initializing a mobile device to operate in a mobile credentialing system, the method including sending an authorization code and host URL from a hotel loyalty application to a mobile credential library of a mobile application on a mobile device, the mobile device operable to perform a first sync with a credential service to establish an ongoing trust relationship between the mobile credential library and the credential service such that the mobile application is operable to interact with an access control without the user of the mobile device knowing either an authorization code or a host location of the credential service.

22 Claims, 7 Drawing Sheets

(51) Int. Cl.
    *H04L 29/06*   (2006.01)
    *H04W 12/08*   (2009.01)
    *H04W 12/06*   (2009.01)
    *H04W 4/02*    (2018.01)

(52) U.S. Cl.
    CPC .............. *H04W 12/08* (2013.01); *H04W 4/02* (2013.01); *H04W 12/06* (2013.01)

(56) References Cited

U.S. PATENT DOCUMENTS

2003/0093997 A1   5/2003   Stalder et al.
2010/0176919 A1   7/2010   Myers et al.
2012/0280783 A1   11/2012  Gerhardt et al.
2013/0127593 A1   5/2013   Kuenzi et al.
2014/0219453 A1   8/2014   Neafsey et al.

* cited by examiner

ACCESS CONTROL SYSTEM WITH AUTOMATIC MOBILE CREDENTIALING SERVICE HAND-OFF

CROSS-REFERENCE TO RELATED APPLICATION

Benefit is claimed of U.S. Provisional Patent Application No. 62/086,262, filed Dec. 2, 2014, and entitled "Access Control System With Automatic Mobile Credentialing Service Hand-off", the disclosure of which is incorporated by reference herein in its entirety as if set forth at length.

BACKGROUND

The present disclosure relates generally to access control systems, and more particularly, to a system and a method for establishing trust relationships and initializing a mobile device to operate in a mobile credentialing system.

An access control system is typically operated by encoding data on a physical key card that indicates access rights. Some access control systems are online where the reader can use some means to communicate with the access control system. In online systems the access rights are usually a reference identifier. Other access control systems are offline and the access rights are encoded as data that can be decoded and interpreted by the offline lock to retrieve the access rights. An example is a hotel locking system where a front desk encodes a guest card and an offline, battery powered lock on a guest room door has the means to decode the card and permit or deny access based on the encoded access rights. Some methods of encoding access rights include sequencing where subsequent access rights have a sequence number that is greater than the prior access rights.

When a user downloads or loads a restricted use application, such as is used for access control in a mobile credentialing system, on a mobile device, the user is typically required to enter account information, for example, an authorization code, which is essentially a software key, installation key, or the like. The account information enables the use of an application through various methods of authenticating the account information and the authorization code encapsulates account information by using encryption and is entered by the user of the mobile device into the application. In addition to the authorization code, the user must typically also enter or select a Host Name for the desired service.

A mobile credential service, for example, can be hosted at different locations reachable by the application on the mobile device and the entered Host Name information would determine which location to use. Further, the separate locations could be for geographic distribution, for load balancing, for disaster recovery if a primary service down, etc. Entering account information or an authorization code, which can be typically 30 numeric digits long, and a Host Name may be cumbersome to perform on a mobile device. In addition, the user may first enter a hotel loyalty account information and it is cumbersome to also be required to enter an authorization code and Host name for the mobile credential service that is utilized by the hotel loyalty application to open access controls, for example, locks to exercise their access rights.

SUMMARY

A method of initializing a mobile device to operate in a mobile credentialing system, the method according to one disclosed non-limiting embodiment of the present disclosure includes sending an authorization code and a host URL to a mobile credential library of a mobile application on a mobile device, the mobile device operable to perform a first sync with a credential service to establish an ongoing trust relationship between the mobile credential library and the credential service such that the mobile application is operable to interact with an access control without a user of the mobile device knowing either the authorization code or the host URL of the credential service.

A further embodiment of the present disclosure includes an automatic hand-off from a first trust relationship to the ongoing trust relationship between the mobile credential library and the credential service.

A further embodiment of any of the foregoing embodiments of the present disclosure includes, wherein the first trust is between the loyalty application and a hotel service.

A further embodiment of any of the foregoing embodiments of the present disclosure includes, wherein the hotel service is based on a hotel loyalty account authorization.

A further embodiment of any of the foregoing embodiments of the present disclosure includes another trust relationship between the hotel service and a credential service based on a service-to-service authorization.

A further embodiment of any of the foregoing embodiments of the present disclosure includes generating mobile credentials at the credential service for download to the credential library.

A further embodiment of any of the foregoing embodiments of the present disclosure includes, wherein the mobile credentials are for an associated user ID account.

A further embodiment of any of the foregoing embodiments of the present disclosure includes, wherein the mobile device includes a smartphone.

A further embodiment of any of the foregoing embodiments of the present disclosure includes, wherein the access control is a lock.

A further embodiment of any of the foregoing embodiments of the present disclosure includes, wherein the access control is a lock box.

A further embodiment of any of the foregoing embodiments of the present disclosure includes, wherein the credential service is hosted from one of a multiple of locations.

A further embodiment of any of the foregoing embodiments of the present disclosure includes, wherein the one of the multiple of locations are selected for geographic load distribution.

A further embodiment of any of the foregoing embodiments of the present disclosure includes, wherein the mobile library decrypts the authorization code, validates the code, and retrieves a mobile library serial number contained in the authorization code.

A further embodiment of any of the foregoing embodiments of the present disclosure includes, wherein the mobile library uses information contained in the authorization code to perform the first sync with a credential service and to authenticate.

A further embodiment of any of the foregoing embodiments of the present disclosure includes, wherein the credential service validates the first sync information and then establishes the ongoing trust relationship between the mobile credential library and the credential service.

A method of initializing a mobile device to operate in a mobile credentialing system, the method according to another disclosed non-limiting embodiment of the present disclosure includes creating a secure connection to a hotel system and sending a password for validation to the hotel system to validate the authenticity of a loyalty account on a loyalty application of a mobile device, and, by association, an authenticity and an identity of a user of the loyalty account; sending a request to a credentialing service from the hotel system to request an authorization code for a user identification; generating an authorization code that is associated with a mobile credentialing account from the credential service; unlocking the mobile credentialing account associated with the authorization code to allow a 'first sync' from the credential service; returning the authorization code to the hotel system from the credential service host location; downloading the authorization code to the loyalty application with the credential service host location; and sending an authorization code and a host URL to a mobile credential library of a mobile application on a mobile device, the mobile device operable to perform a first sync with a credential service to establish an ongoing trust relationship between the mobile credential library and the credential service such that the mobile application is operable to interact with an access control without the user of the mobile device knowing either the authorization code or the host URL of the credential service.

A further embodiment of any of the foregoing embodiments of the present disclosure includes, wherein the credential service is hosted from one a multiple of locations.

A further embodiment of any of the foregoing embodiments of the present disclosure includes, wherein the one of the multiple of locations are selected for geographic load distribution.

A further embodiment of any of the foregoing embodiments of the present disclosure includes, wherein the mobile library decrypts the authorization code, validates the code, and retrieves a mobile library serial number contained in the authorization code.

A further embodiment of any of the foregoing embodiments of the present disclosure includes, wherein the mobile library uses information contained in the authorization code to perform the first sync with a credential service and to authenticate.

A further embodiment of any of the foregoing embodiments of the present disclosure includes, wherein the credential service validates the first sync information and then establishes the ongoing trust relationship between the mobile credential library and the credential service.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
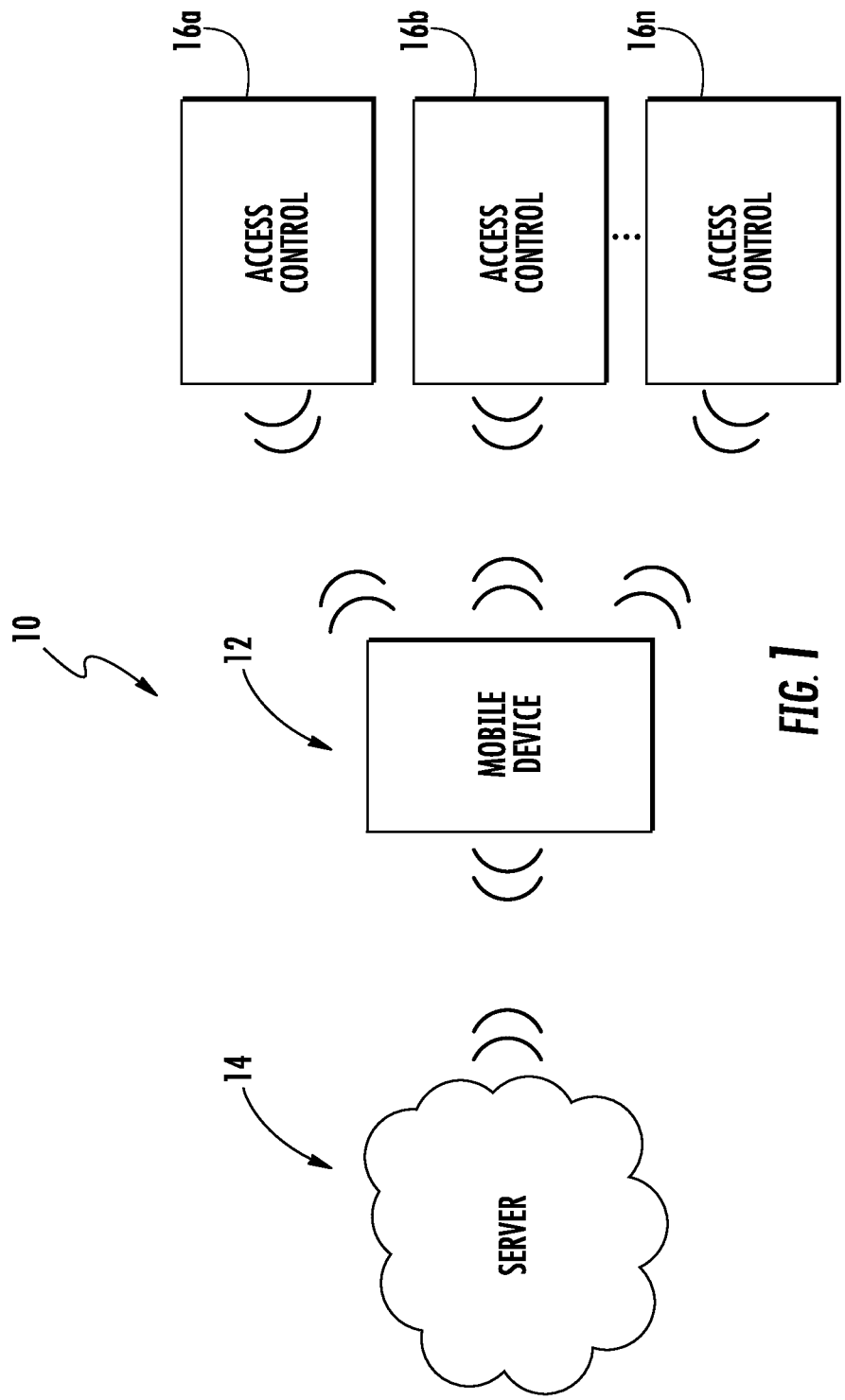
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone, that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
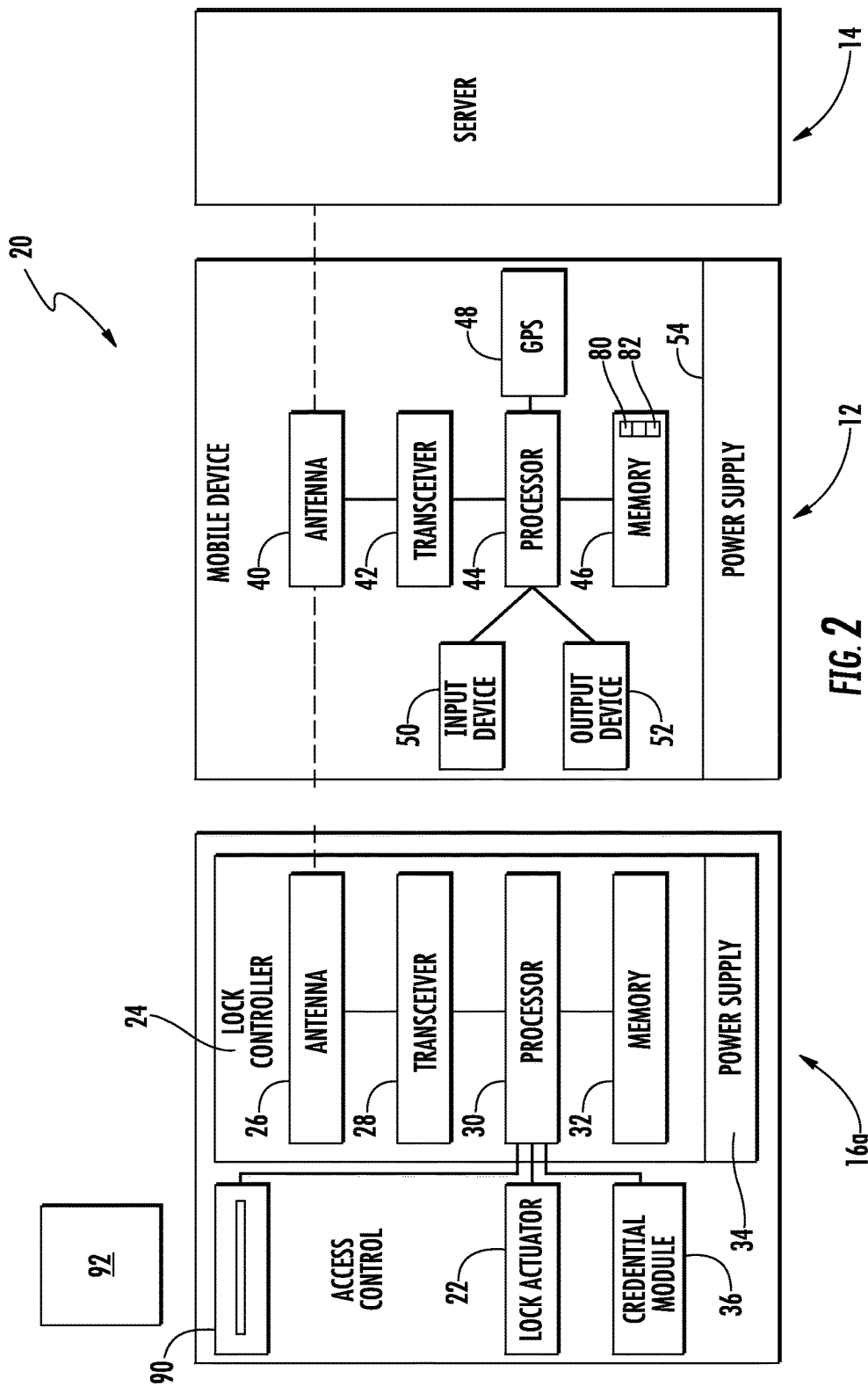
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

Figure 3:
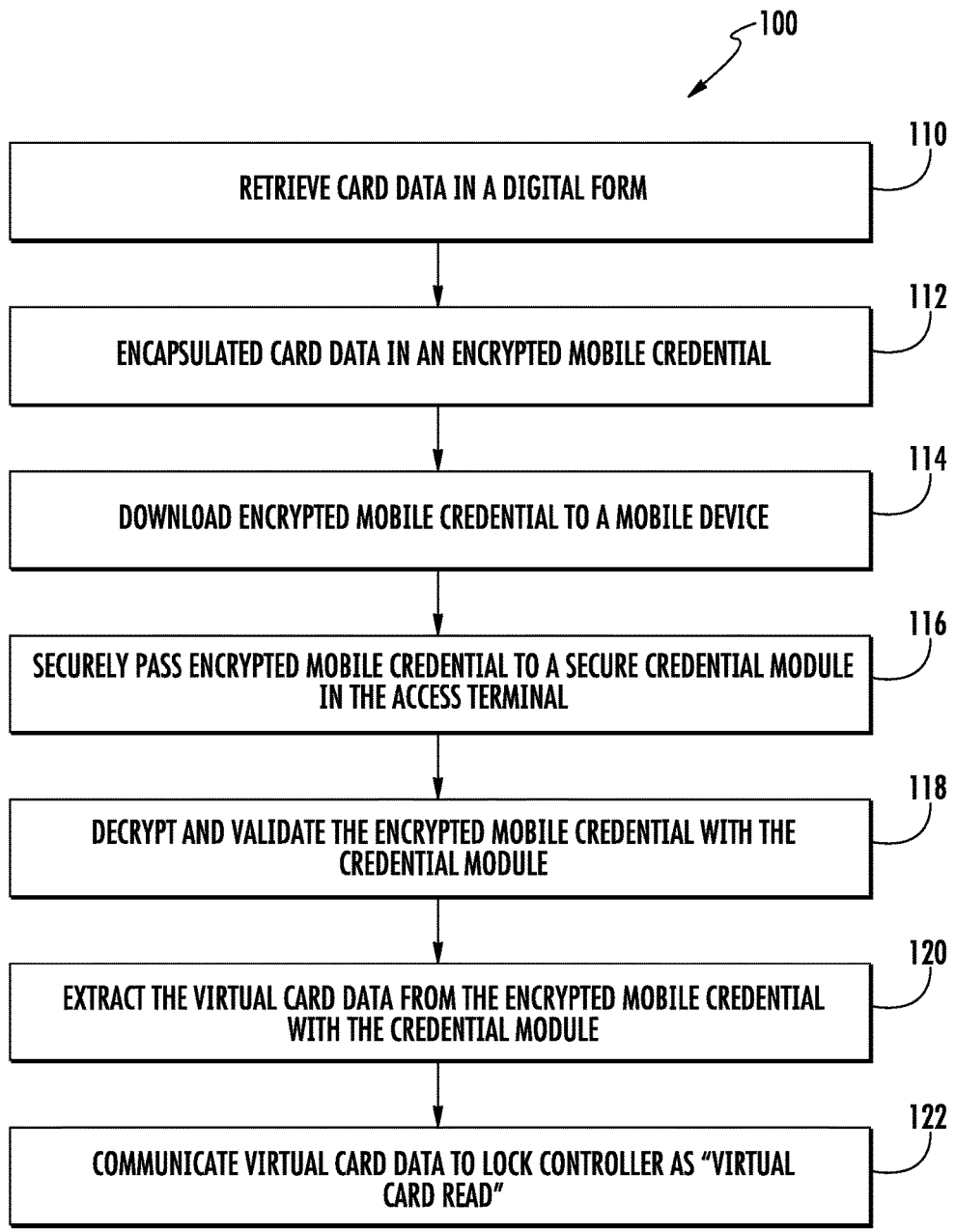
FIG. 3 is a flowchart of a credential management method performed by the user authentication system.

With reference to FIG. 3, a method 100 to facilitate communication of a credential representative of data that would normally be physically encoded on the key card 92 is retrieved in a digital form (step 110), encapsulated in an encrypted credential (step 112), downloaded to the mobile device 12 (step 114), securely passed to the credential module 36 (step 116) that decrypts and validates the credential (step 118), extracts the virtual card data (step 120), then passes the virtual card data into the lock controller 24 as a "virtual card read" (step 122). This, for example, permits a user to bypass a front desk of a hotel and go directly to their room as will be further described. The encrypted credential may be generated by the server 14 using well known techniques for digital certificate creation and encryption using cryptographic algorithms such as AES, ECC, RSA, and the like. For example, the credential may contain but is not limited to including a credential identifier, a parameter indicating the type or format of the credential, it may contain encrypted data such as the virtual card data, and it may contain a digital signature. The encrypted data may be encrypted with an AES-128 encryption key that can be known to the credential module 36. Or it may be encrypted with a derived encryption key that can be determined from information contained in the credential. Further, the digital signature may be a CBC-MAC type signature based on an AES-128 encryption key, for example, that can be known by the credential module 36. Or, it could be a digital signature based on a private key known to the server 14 and can be validated by a public key known to the credential module 36.

Figure 4:
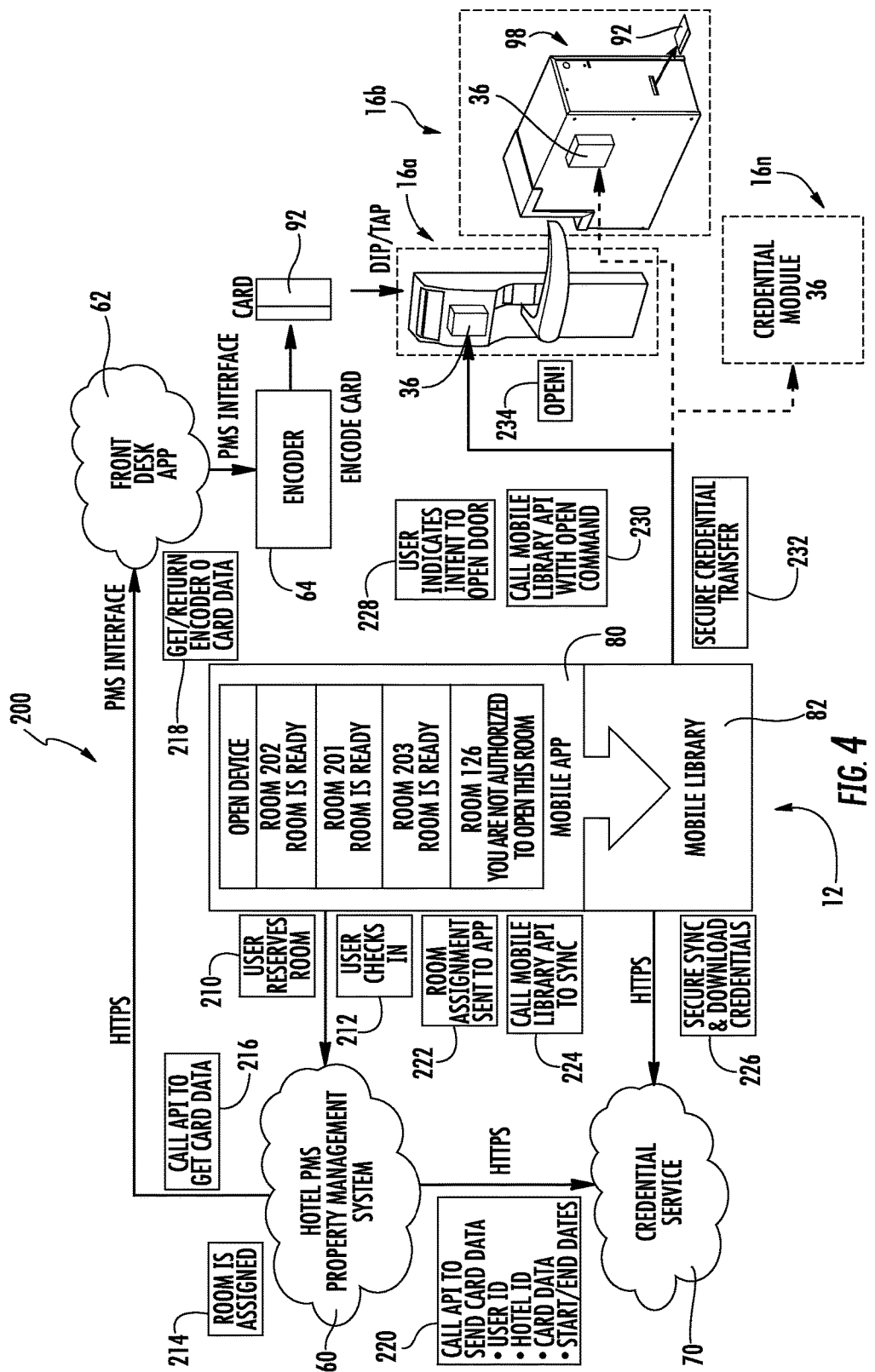
FIG. 4 is a flowchart of a credential management method performed by the user authentication system according to one disclosed non-limiting embodiment.

With reference to FIG. 4, one example bypass the front desk method 200, is initiated by a user who first reserves a hotel room (step 210) through any process supported by a hotel, such as mobile reservations, web sites, travel agents, etc. Later, a check-in procedure confirms their stay (step 212). Again, this can be performed through any process supported by the hotel.

Next, a room is assigned in a hotel property management system 60 based on the guest preferences (or room selection) and the room availability on check-in (step 214). The hotel property management system 60 may use a software-to-software application programming interface (API) provided by a front desk application 62 to request card data in a digital form (step 216). The front desk application 62 may range from a stand-alone encoder 64 to a complete software package running in a cloud that is operable to encode a virtual card for the room that was selected and return the virtual card data back to the hotel system (step 218).

Next, the hotel property management system 60 will make another software-to-software API call to a credential service 70 after the hotel system has authenticated the user and has allocated a room stay reservation (step 220). The pertinent information is communicated to the credential service 70 with an indication to include, for example, what hotel property, what room, what guest (e.g. User ID), what dates and also the virtual card data for the stay.

Simultaneous, or in sequence with sending the virtual card data to the credential service 70, the hotel property management service 60 communicates an indication to the user (again, through any conventional method) that the check-in is confirmed and the room is assigned (step 222).

Next, a mobile device 12 based hotel loyalty mobile application 80 will utilize a software-to-software API in a mobile library 82 (step 224) to download credentials from the credential service 70 (step 226). The mobile library 82 will securely authenticate to the credential service 70 with a prior established shared secret that may change on every successful connection.

Once authenticated, the credential service 70 generates at the time of the communication from the mobile library 82 the credentials for the user and encrypts into the credentials the virtual card data received in step 220 for the guest associated with this instance of the mobile library. One credential is generated for each door or access point and the virtual card data will be the same in each of these separate credentials, but may be encrypted with a unique key for the particular door or access point. The method of encryption may be AES, 3DES, or other such encryption method. The method and type of credential used may be a compressed digital certificate or a standard based certificate like X.509 or other certificate format known to the art. That is, for example, the virtual card data is encrypted into the credential with a unique key known by the credential module 36 and by the credential service 70.

The mobile library 82 will download and store the list of credentials on the mobile device 12 using native OS protections and additional encryption of data with device specific information, e.g., UDID, IMEI, IMSI, MAC addresses, etc. Now that the check-in is complete and the encrypted mobile credential (with virtual card data) is resident on the mobile device 12 (FIG. 2), the user can operate the access control 16 in an offline mode at any later time without the mobile device 12 being required to be connected to the credential service 70. Additional embodiments may have the mobile device 12 download a credential at the same time mobile device is communicating to access control 16 at the same time the user wishes to access their room, for example.

When the user wishes to access their room (step 228), the user indicates such intent through a gesture, a click of a button, a tap on the screen, a finger print read, password, proximity to the lock, touching the lock, etc. In response to this, intent, the hotel loyalty mobile application 80 again calls the software-to-software API in the mobile library 82 to initiate the secure transfer of the encrypted mobile credential to the access control 16 (step 230). While the loyalty application 80 initiates the transfer, the mobile library implements the secure transfer separately in the next step.

Secure transfer of the credential (step 232) may start with a process of the mobile library 82 listening for a signal advertisement such as Bluetooth low energy (BTLE) advertisements from in-range access controls 16. That is, the access controls 16 are advertising their presence on a periodic rate with advertisement data that indicates an identifier of the access control 16 and the mobile device 12 can listen and connect automatically without the person having to push a button to wake-up a sleeping, battery powered lock 16 or to get out of a vehicle to interact with a reader access point on a garage door or other device. The reader access point is another type of lock 16. Another embodiment is to use Near Field Communication (NFC) and the person 'taps' their mobile device to the lock 16 and a secure credential exchange transfers the mobile credential to the access control 16 (step 232). Secure credential exchanges can be done using standard techniques such as establishing a session key, encrypting communication messages, and validating the authenticity of message sender and receiver.

In the preferred embodiment where the access control advertises using Bluetooth low energy (BTLE), the mobile library 82 filters the received advertisements based on the received identifier of the access control 16 and by comparing with identifiers contained in or associated with each credential in the list of mobile credentials and based on the user intent to access a particular room. Once an advertisement is received for a target access control 16, the mobile library 82 initiates a wireless connection, and performs a secure transfer of the encrypted mobile credential (step 232). The secure transfer may utilize a unique session encryption key and standard cryptographic algorithms and techniques. It should be appreciated that the data can be securely transmitted over any wireless link, to include but not be limited to BTLE, zigbee, Near Field Communication, etc.

The credential module 36 will receive the encrypted mobile credential, then validate and decrypt the encrypted mobile credential to retrieve the virtual card data. The decryption and validation may include, but not be limited to, validating a digital signature, validating the type of the credential, validating that the credential identifier matches an identifier in the lock memory 32, validating a starting date and an expiring date of the credential, validating the source of the credential, etc. (step 118; FIG. 3). Once validated and decrypted, the virtual card data is extracted (step 120; FIG. 3).

The virtual card data is then communicated via hardware and software interfaces, depending on embodiments, to the lock controller 24 which may further decrypt the virtual card data, processes the data based on lock vendor rules, then open the lock if entry is permitted (step 234). Notably, the virtual card data is communicated into the lock controller 24 as a "virtual card read" in a data format equivalent to that of a physical key card. This thus permits the continued usage of traditional guest key cards 92 such as that of a family member, or a guest that just wants a copy of the physical key card 92, along with usage of the mobile device 12.

The audit trail uploaded by the mobile device 12 can be just the audits generated by the mobile device 12 itself, or can be the unified audits including openings by the guest using a physical key card. In addition, when the lock 16 is opened, a battery status or other maintenance information thereof may be uploaded into the audit trail from the mobile device 12 to the credential service 70 so that the hotel can be notified of low battery conditions and proactively change the batteries, or perform other maintenance. Other information associated with the audit trail can include, for example, failed openings or failed attempts or credentials that failed validation.

Usage of the "virtual card read" maintains a contiguous audit trail and also maintains all the known use cases for access control that are already encoded into traditional card data. Furthermore, the credential module 36 is lock vendor agnostic, so that any lock vendor's data could be passed through to allow each lock vendor to independently innovate card data. Further, the credential module 36 may be supplied by a different company than the lock 16. And also, the server 14, mobile device 12, and credential module 36 may have no means for further decrypting or validating the card data other than treating it like a data object to be encoded, encrypted, transferred, retrieved and delivered. Additionally, the "virtual card read" can be used offline without requiring the mobile device 12 to be online with a Wi-Fi connection or real time connection to a credential service. That is, the data for the "virtual card read" is stored on the mobile device 12 and passed securely to the credential module 36 in an offline mode. This is not to limit the capability to also send the "virtual card read" in an online mode. An additional benefit is that any access controls 16 can use any card types in addition to using a credential module 36, where the card types include but are not be limited to, Magnetic strip, RFID, Proximity, etc.

In another disclosed non-limiting embodiment, the credential module 36 can be used for many purposes, to include, but not be limited to, passing data to a self-service hard-key dispenser unit 98 that produces physical key cards 92. The hard-key dispenser unit 98 has a credential module 36 that receives the virtual card data, decrypts, extracts and sends to a lock controller 24 configured to encode the data onto a physical key card 92. That is, the virtual card data on the mobile device 12 is written to a physical key card 92 by the unit 98 and dispenses the key card 92 in an automated manner. The unit 98 does not require any user interface besides the dispensing element for the key card 92 and a unit power source, including but not limited to batteries, mains power, energy harvesting, and the like. The user interface for the unit 98 is really the interface of the mobile device 12. When the unit 98 begins to run low on blank key cards 92, the mobile device 12 can upload to the credential server 70 an indication of the status that can be turned into a report to notify the hotel that the unit 98 needs to be refilled.

In other disclosed non-limiting embodiments, the virtual card data can be standard access control card data (i.e. identification data) for badge access systems, or integrated into a vending machine with the virtual card data as credit card information, tokens, purchase reference identifiers, or the like.

Figure 5:
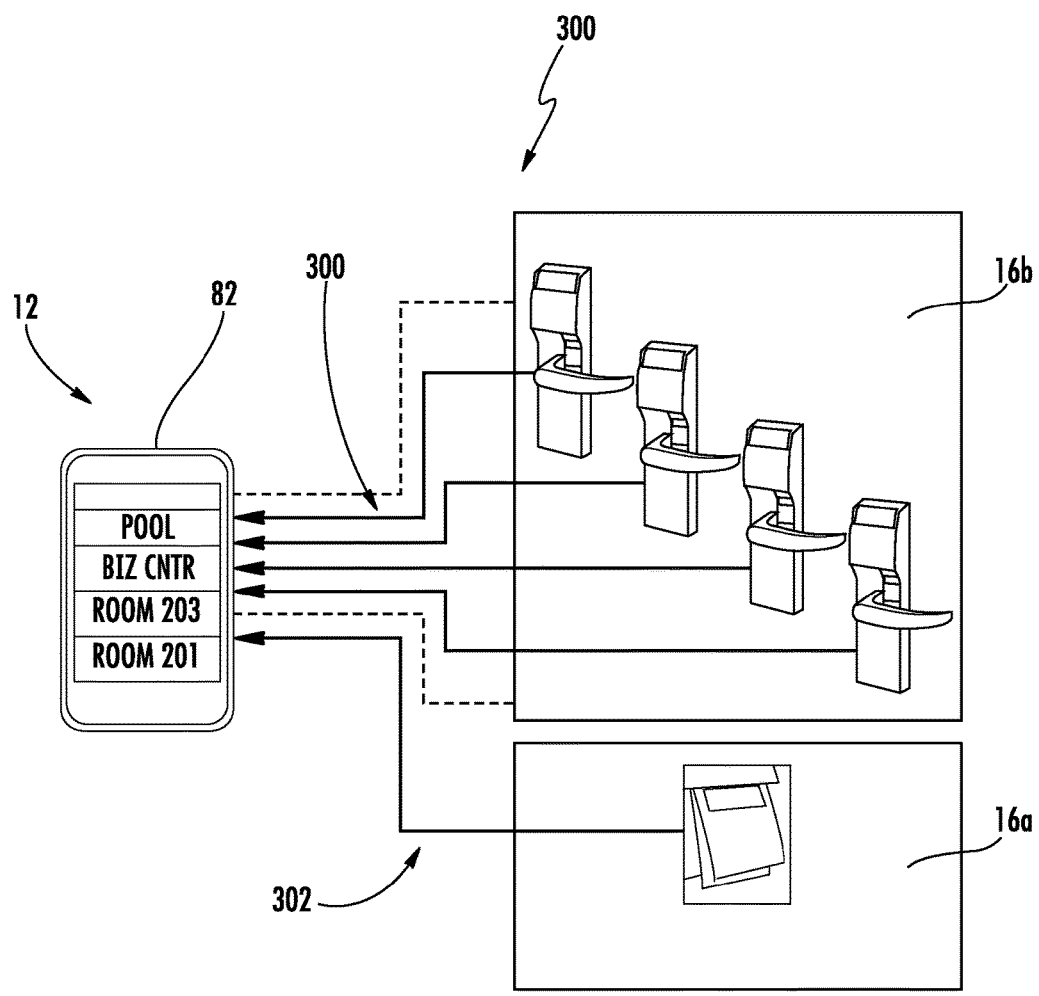
FIG. 5 is a schematic view of a credential according to another disclosed non-limiting embodiment.

With reference to FIG. 5, the mobile library 82 may include a set of mobile credentials that were generated by the credential service 70 based on access categories 300 (implicit permission) in addition to the mobile credential with virtual card data (explicit permission) 302 that was generated by the credential service 70 for a specific access control 16a. The access categories 300 operate to grant the user access to a particular grouping of access controls 16b that have collective meaning. For example, one access category could be 'Public Rooms' for access to a pool, business center, elevator, and wall readers. In the context of a hotel reservation, when the mobile device 12 communicates with the credential service 70 to download the encrypted mobile credential, the credential service 70 generates credentials for each lock in one or more access categories that the guest has been granted access. The encrypted mobile credential will thus have the same virtual card data encoded specifically for each specified access point, e.g., pool, business center, etc. and may optionally have the access category downloaded in or with the credential. However each mobile credential will be encrypted separately with a unique key for each access control 16b.

Provision and use of the access category 300 by the credential service 70 facilitates the efficient management of multiple access controls 16b in a system where the mobile device 12 can open multiples of locks where the mobile device 12 has a specific credential for each lock. This is simpler when compared to that which is conventionally required, e.g., two access control systems—one for the hotel system that generates the virtual card data with all the current art for hotel system access business rules, and a second one for granting access with a mobile credential to each access point, e.g., guest room, wall readers, pool, business lounge, etc. In other words, the business rules for the hotel system would need to be duplicated in the credential service.

The access category 300 allows for multi-vendor integration and can work separately from the hotel system access business rules that get encoded into virtual card data. The mobile credentials are thus an additional 'layer' of security "on top" of the virtual card data. The access category 300 also allows for relatively more simple maintenance procedures, such as, for example, when a lock in the 'Public' Access Category is replaced, the replacement lock need only be assigned to the same access category. However, a mobile device 12 would still need to communicate again to the credential service 70 for a new set of mobile credentials to be downloaded. No further administration is required on the part of the guest or system besides including the replacement lock in the correct access category and all guest permissions will continue to work seamlessly without modification even though the new lock has unique encryption keys from the prior lock.

Figure 6:
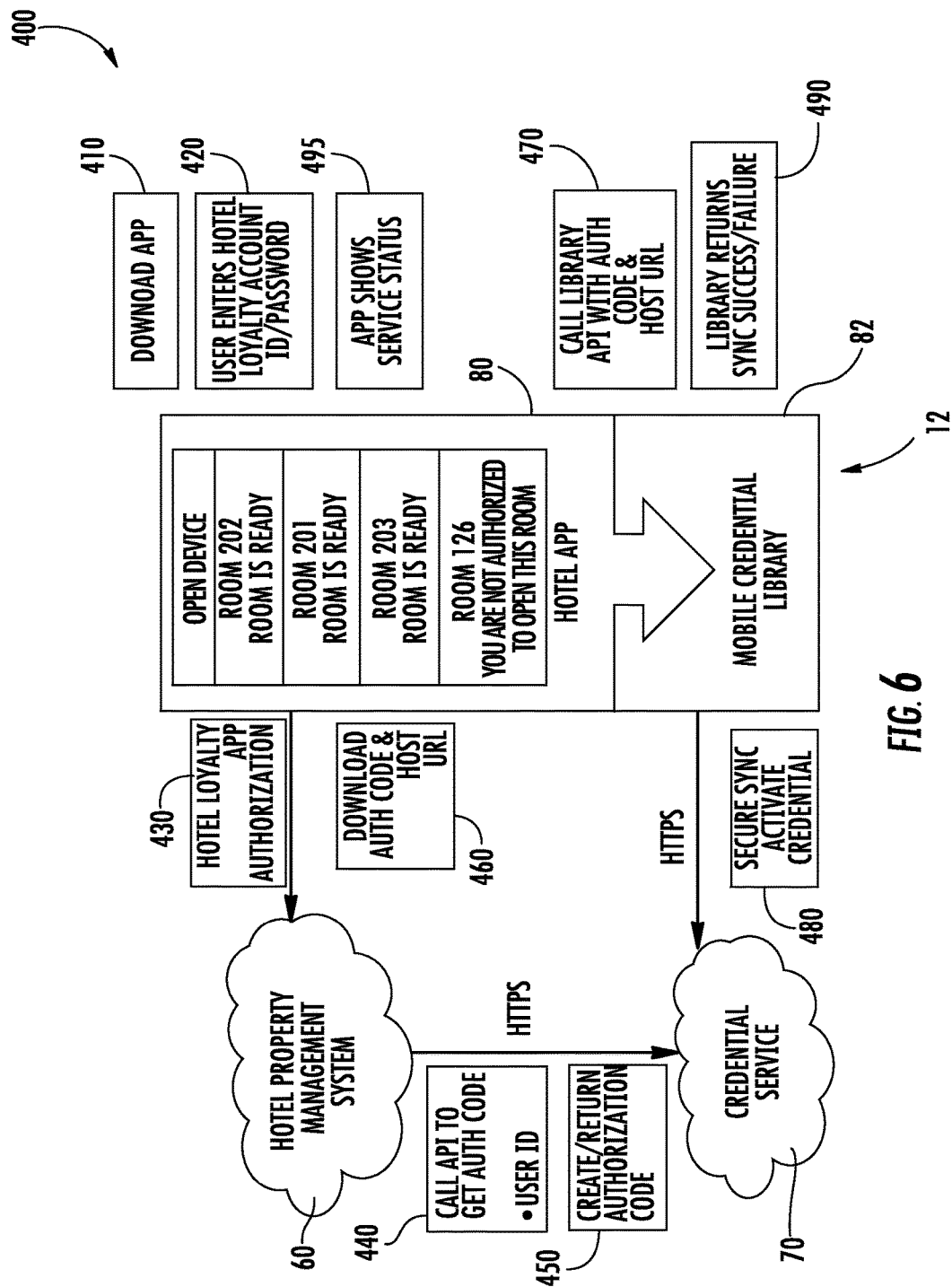
FIG. 6 is a flowchart of a credential service hand-off method performed by the user authentication system according to one disclosed non-limiting embodiment.

With reference to FIG. 6, in another disclosed non-limiting embodiment, a method 400 of initializing a mobile device to operate in a mobile credentialing system initially includes downloading an application to the mobile device 12 (step 410). In one example, the application includes two parts compiled together, one part the hotel loyalty application 80 and the other part a mobile credential library 82 as described above to provide a unified experience with a single user interface. Further, the hotel loyalty application 80 makes use of the mobile credential library 82 through a software-to-software application programming interface (API) provided by the mobile credential library 80. Another example includes two separate applications, one being the hotel loyalty application and the other a mobile credential application that requires authenticated (e.g. token, ID/password, bi-directional certificate exchange, etc.) application-to-application communication with cross-application calls to perform the API calls such that the credential application includes a user interface for interaction. In either example, the method 400 described herein can be performed.

Next, once the application is loaded, the user authenticates their hotel loyalty application 80 (step 420). This is typically initiated by entering a hotel loyalty account identifier and a password into the hotel loyalty application 80 on the mobile device 12.

Next, the hotel loyalty application creates a secure connection to the hotel property management system 60 and communicates the ID and password for validation (step 430). Establishing this secure connection and communicating or validating the ID and password may be performed via well known techniques in the art of validating user accounts. The hotel property management system 60 thus is validating the authenticity of the hotel loyalty account and by association the authenticity and identity of the user.

Next, based on, for example, preferences that indicate the hotel loyalty account is enabled for mobile credentialing, and that the hotel loyalty application 80 supports mobile credentialing, the hotel property management system 60 will automatically send a request to the credentialing service 70 through a software-to-software application programming interface (API) to request an authorization code for this particular user ID (step 440). The credential service 70 trusts the hotel property management system 60 to first authenticate the user ID and accepts the API call through normal trusted relationships, including, but not limited to, a hotel system administrative account (ID/password) in the credential service client and server SSL certificates, a VPN, a bi-directional SSL certificate exchange, or just by the fact that the hotel property management system 60 and credential service 70 are hosted in the same environment.

Next, after receiving the request for an authorization code, the credential service 70 generates the authorization code for the identified mobile credentialing account (step 450). The authorization code is encrypted and contains a mobile credential library serial number identifier and information for establishing the first connection to the credential service 70. This authorization code may, for example, be 30 digits long or any length required to include the information required and to provide random information to assure security and validate the authenticity of the authorization code.

In addition to generating the authorization code, the credential service 70 also unlocks the mobile credentialing account associated with the authorization code to allow a 'first sync.' Unlocking can include for example, an attribute of the account where after the first sync the service will require a challenge/response from the mobile library 82 to be validated by the credential service 70 in order to further communicate between the mobile library 82 and credential service 70 to, for example, generate mobile credentials and download. A shared secret would be established on the first sync between the credential service 70 and the mobile credential library 82 that could be used for the challenge/response as is well known in the art of authenticating a system with a shared secret. The shared secret may change or 'roll' on subsequent syncs so that the first sync could no longer be performed. Alternatively, unlocking may include storing information encrypted in the authorization code that can be sent to the credential service by the mobile credential library 82 and is compared on the first sync or is used with a challenge/response on the first sync as a first shared secret. Once this information matches, it is changed on subsequent syncs so that the authorization code may no longer be useable again because the 'first sync' information has changed.

Next, the authorization code is returned to the hotel property management system 60 and is then automatically downloaded to the hotel loyalty application 80 along with the credential service host URL (step 460). The host URL is provided so that the hotel system 60 can direct the mobile credential library 82 to communicate to a specific instance of the credential service 70. The credential service 70 could be, for example, hosted in different locations for geographic load distribution, or hosted separately for a backup datacenter should the primary be down. The selection of the host URL by the hotel system 60 can be done with a configuration parameter in the hotel system 60, or it can be done by inference based on the location of the API of the credential service 70, or it can be done based on the status of the credential service 70, etc.

Next, the hotel loyalty application 80 sends the authorization code and credential service host URL to the mobile credential library 82, again through a software-to-software API (step 470). By passing the authorization code to the credential library 82, the hotel loyalty application 80 is handing over a trust relationship that was first established between the hotel loyalty application 80 and the hotel management system 60 and that was further extended to include the credential service 70 and now will include also the mobile library 82.

Next, the mobile library 82 decrypts the authorization code, validates the authorization code, and then retrieves a mobile library serial number and other information contained in the authorization code (step 470). The mobile library 82 uses the information to perform the first sync with the credential service 70 and to authenticate (step 480). The credential service 70 validates the first sync information and then establishes the ongoing trust relationship between the mobile credential library 82 and the credential service 70. The first sync is described above and after this first sync, the mobile library 82 will have a shared secret with the credential service 70 that can be used to authenticate on subsequent syncs. Additionally, on the first sync, the mobile library 82 can validate the authenticity of the credential service 70 by validating, for example, a SSL certificate from the credential service 70 host.

Figure 7:
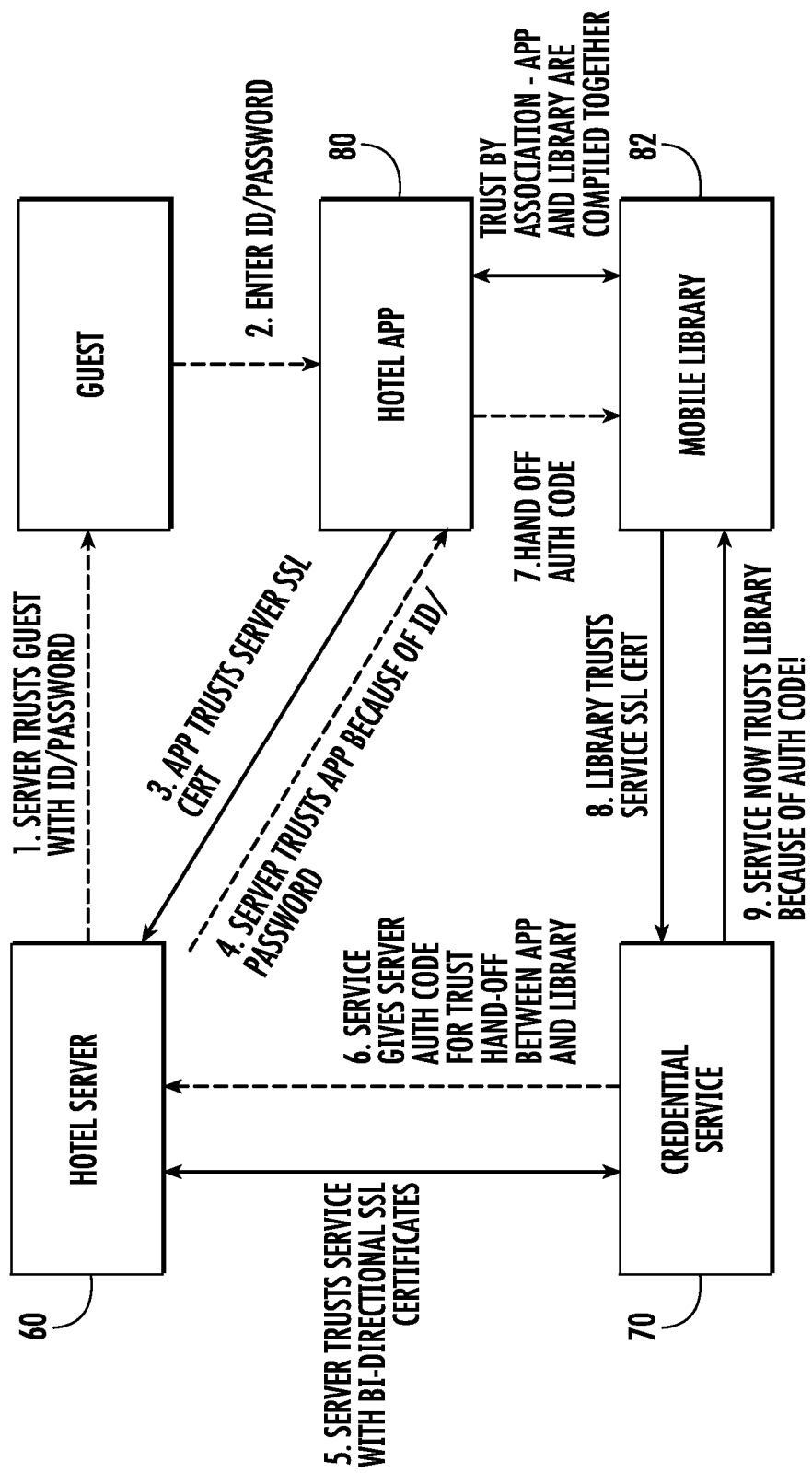
FIG. 7 is a flowchart of the trust relationships for the credential service hand-off method according to one disclosed non-limiting embodiment.

Thus, there are three primary trust relationships (FIG. 7): one between the hotel loyalty application 80 and the hotel property management system 60 which is based on the hotel loyalty account authorization; another between the hotel property management system 60 and the credential service 70 based on service-to-service authorization such as bi-directional SSL certificate exchange and validation; and now a 3rd trust relationship that has been created by the automatic hand-off from the first trust relationship to the 3rd trust relationship which is a trust relationship between the mobile credential library 82 and the credential service 70. During the first sync and thereafter, the credential service 70 generates mobile credentials to the mobile credential library 82 for the associated user.

Next, after the first sync, the mobile credential library 82 indicates to the hotel loyalty application 80 the status of the first sync, e.g., success/failure, (FIG. 6, step 490). The hotel loyalty application 80 then indicates a ready for service (step 495). Now that the mobile credential library 82 is fully provisioned and has downloaded the mobile credentials, the application 80 can be used to open hotel guest room locks, interact with key dispensers, real estate lock boxes, and other mobile computing and mobile credentialing uses.

The method 400 of initializing a mobile device to operate in a mobile credentialing system thereby operates without a user of the mobile device 12 having to know either the authorization code or the host location for the credential service 70. Additionally, the hotel loyalty application 80, can change the host location as needed to balance or regionalize users around the world for load balancing, or to manage service outages without the user being apprised about the credential service 70 host location. That is, the method provides centralized authentication and decentralized deployment.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of initializing a mobile device to operate in a mobile credentialing system, the method comprising:
   sending an authorization code and a host Uniform Resource Locator (URL) to a mobile credential library of a mobile application on a mobile device, the mobile device operable to perform a first sync with a credential service to establish an ongoing trust relationship between the mobile credential library and the credential service such that the mobile application is operable to interact with an access control without a user of the mobile device knowing either the authorization code or the host URL of the credential service; and
   handing-off from a first trust relationship to the ongoing trust relationship between the mobile credential library and the credential service, wherein the first trust relationship is between a user's account or a user of loyalty account on a loyalty application and a service, and a second trust relationship is between the service and the credential service based on a service-to-service authorization, the second trust relationship different than the first trust relationship.

2. The method as recited in claim 1, further comprising an automatic hand-off from the first trust relationship to the ongoing trust relationship between the mobile credential library and the credential service.

3. The method as recited in claim 2, wherein the first trust relationship is between the user's account on the loyalty application and the service, the user's account comprising an ID and password.

4. The method as recited in claim 1, wherein the service is a hotel service based on a hotel loyalty account authorization.

5. The method as recited in claim 1, further comprising generating mobile credentials at the credential service for download to the credential library.

6. The method as recited in claim 5, wherein the mobile credentials are for an associated user ID account.

7. The method as recited in claim 1, wherein the mobile device includes a smartphone.

8. The method as recited in claim 7, wherein the access control is a lock.

9. The method as recited in claim 7, wherein the access control is a lock box.

10. The method as recited in claim 1, further comprising creating a 3rd trust relationship between the mobile credential library and the credential service, the credential service generating mobile credentials to the mobile credential library for the associated user during the first sync and thereafter.

11. The method as recited in claim 1, wherein the credential service is hosted from one of a multiple of locations.

12. The method as recited in claim 11, wherein the one of the multiple of locations are selected for geographic load distribution.

13. The method as recited in claim 1, wherein the mobile library decrypts the authorization code, validates the code, and retrieves a mobile library serial number contained in the authorization code.

14. The method as recited in claim 13, wherein the mobile library uses information contained in the authorization code to perform the first sync with a credential service and to authenticate.

15. The method as recited in claim 14, wherein the credential service validates the first sync information and then establishes the ongoing trust relationship between the mobile credential library and the credential service.

16. A method of initializing a mobile device to operate in a mobile credentialing system, the method comprising:
   creating a secure connection to a system and sending a password for validation to the system to validate the authenticity of a loyalty account on a loyalty application of a mobile device, and, by association, an authenticity and an identity of a user of loyalty account or a user's account;
   sending a request to a credentialing service from the system to request an authorization code for a user identification;
   generating an authorization code that is associated with a mobile credentialing account from the credential service;
   unlocking the mobile credentialing account associated with the authorization code to allow a 'first sync' from the credential service;
   returning the authorization code to the system from the credential service host location;
   downloading the authorization code to the loyalty application with the credential service host location;
   sending an authorization code and a host Uniform Resource Locator (URL) to a mobile credential library of a mobile application on a mobile device, the mobile device operable to perform a first sync with a credential service to establish an ongoing trust relationship between the mobile credential library and the credential service such that the mobile application is operable to interact with an access control without the user of the mobile device knowing either the authorization code or the host URL of the credential service;
   handing-off from a first trust relationship to the ongoing trust relationship between the mobile credential library and the credential service, wherein the first trust relationship is between the user's account on the loyalty application and a service, and a second trust relationship is between the service and the credential service based on a service-to-service authorization, the second trust relationship different than the first trust relationship; and creating a 3rd trust relationship between the mobile credential library and the credential service, the credential service generating mobile credentials to the mobile credential library for the associated user during the first sync and thereafter.

17. The method as recited in claim 16, wherein the credential service is hosted from one of a multiple of locations.

18. The method as recited in claim 17, wherein the one of the multiple of locations are selected for geographic load distribution.

19. The method as recited in claim 16, wherein the mobile library decrypts the authorization code, validates the code, and retrieves a mobile library serial number contained in the authorization code.

20. The method as recited in claim 19, wherein the mobile library uses information contained in the authorization code to perform the first sync with a credential service and to authenticate.

21. The method as recited in claim 20, wherein the credential service validates the first sync information and then establishes the ongoing trust relationship between the mobile credential library and the credential service.

22. The method as recited in claim 16, wherein the first trust relationship is between the user's account on a loyalty application and the service is a hotel service.

* * * * *